United States Patent
Desjardins

(10) Patent No.: US 6,600,444 B2
(45) Date of Patent: Jul. 29, 2003

(54) SYSTEM AND METHOD FOR COMPUTING NAVIGATION INFORMATION IN THE PRESENCE OF INTERFERENCE

(75) Inventor: Gerard A. Desjardins, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/079,558

(22) Filed: Feb. 22, 2002

(65) Prior Publication Data

US 2002/0118133 A1 Aug. 29, 2002

Related U.S. Application Data

(60) Provisional application No. 60/271,217, filed on Feb. 23, 2001.

(51) Int. Cl.[7] .............................................. H04B 7/185
(52) U.S. Cl. ................................................ 342/357.12
(58) Field of Search ........................... 342/352, 357.01, 342/357.06, 357.12; 701/213, 215

(56) References Cited

U.S. PATENT DOCUMENTS

| 5,008,679 A | 4/1991 | Effland et al. |
| 5,331,329 A | 7/1994 | Volkov et al. |
| 5,422,813 A | 6/1995 | Schuchman et al. |
| 5,872,540 A | 2/1999 | Casabona et al. |
| 5,936,571 A * | 8/1999 | Desjardins ............. 342/357 |
| 5,982,324 A | 11/1999 | Watters et al. |
| 5,999,124 A | 12/1999 | Sheynblat |
| 6,031,487 A | 2/2000 | Mickelson |
| 6,084,540 A | 7/2000 | Yu |
| 6,175,327 B1 * | 1/2001 | Lin et al. ............ 342/357.06 |
| 6,392,596 B1 * | 5/2002 | Lin et al. ............... 342/378 |
| 6,424,914 B1 * | 7/2002 | Lin ......................... 701/214 |

* cited by examiner

Primary Examiner—Dao Phan
(74) Attorney, Agent, or Firm—Finnegan, Henderson, Farabow, Garrett & Dunner, L.L.P.

(57) ABSTRACT

Navigation information for a first navigation system is computed based on interference signals and satellite signals. The first navigation system comprises means for receiving N satellite signals capable of being processed and at least M interference signals, where $M=K-N$ and K equals the minimum number of satellites required to be tracked for unambiguously determining navigation information for the first navigation system. Based on the at least M interference signals and the N satellite signals received and capable of being processed, the navigation system computes navigation information for the first navigation system.

14 Claims, 2 Drawing Sheets

SYSTEM AND METHOD FOR COMPUTING NAVIGATION INFORMATION IN THE PRESENCE OF INTERFERENCE

CROSS-REFERENCE TO RELATED APPLICATION

This application claims the priority benefit of U.S. Provisional Application No. 60/271,217, filed on Feb. 23, 2001, which is incorporated herein by reference.

FIELD OF THE INVENTION

The present invention generally relates to satellite based navigation devices and, more particularly, to the use of interference signals by satellite based navigation devices to assist in navigation when one or more satellite signals are incapable of being processed.

BACKGROUND OF THE INVENTION

A satellite based navigation device works by receiving and processing satellite signals from a global navigation satellite system such as the Global Positioning System (GPS), which consists of twenty-four satellites that orbit the earth and transmit signals that are received by the navigational device. A detailed description of GPS can be found in U.S. Government documents, Technical Characteristics of the Navstar GPS, June 1991 and GPS Interface Control Documents, ICD-GPS-200, July 1992. Satellite based navigation devices have been used for many years to assist in navigation. Initially, GPS navigation devices were used for military applications. Today, in addition to military applications, satellite based navigation devices are used commercially and privately in automobiles, boats, and aircraft, for example.

Unfortunately, satellite navigation signals are susceptible to interference, both unintentional and intentional, due to the low power level of the satellite signals. Signals from cellular telephones and television transmitters, for example, may unintentionally interfere with satellite signals. However, intentional interference, i.e., jamming, may be produced to interfere with the satellite navigation signals. When interference occurs, the performance of the navigation device degrades.

To maintain or improve the performance of a satellite based navigation device in the presence of interference, a system for locating the source of the interference was developed by the Lockheed Martin Corporation and is described in U.S. Pat. No. 5,936,571, which is incorporated herein by reference. By knowing the location of the interference, the performance of the navigation device may be maintained or enhanced in the presence of the interference by, for example, avoiding the interference, i.e., planning a route that minimizes the impact of the interference, or eliminating the interference.

However, under certain circumstances, knowing the location of the interference is not sufficient to maintain or improve the performance of the navigation device in the presence of the interference. For example, avoiding the interference or eliminating the interference may not be possible or desirable.

Anti-jamming techniques have also been developed to maintain or improve the performance of satellite based navigation devices in the presence of interference. However, these techniques have their limitations and in some circumstances are incapable of sufficiently suppressing the interference, thereby making it impossible for the navigation devices to process one or more satellite signals.

Accordingly, there is a need for a system that may maintain or improve the performance of satellite based navigation devices when it is not possible or desirable to avoid or eliminate interference or when the navigation devices can not process one or more satellite signals due to the interference.

SUMMARY OF THE INVENTION

There is provided a method for computing navigation information for a first navigation system. The method comprises receiving N satellite signals capable of being processed and at least M interference signals, where $M=K-N$ and K equals the minimum number of satellites required to be tracked for unambiguously determining navigation information for the first navigation system. The method further comprises computing navigation information for the first navigation system based on the at least M interference signals and the N satellite signals received and capable of being processed.

Additional advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

Generally, a satellite based navigation system may be capable of accurately computing its position, velocity, and time if it receives signals from four suitably positioned satellites and knows the position, velocity, time, and frequency of the satellites. The navigation system may accurately compute its position, velocity, and time by computing the pseudo-ranges and pseudo-range rates to the four satellites. However, when the navigation system is in the presence of interference signals, it may not be possible for the navigation system to process a sufficient number of satellite signals to accurately compute its position, velocity, and time.

The present invention addresses this problem by using interference signals from one or more interference sources to assist in computing the position, velocity, and time of the navigation system. According to an embodiment of the present invention, interference signals are used in place of satellite signals to compute the position, velocity, and time of a navigation system when the satellite signals are unavailable and the location of the interference signal sources and the pseudo-ranges and pseudo-range rates to the source of the interference signals can be computed. Methods for converting pseudo-range measurements to position and time and pseudo-range rate measurements to velocity and frequency are disclosed in *Global Positioning System: Theory and Applications*, vol. I, ch. 9, (Bradford W. Parkinson & James J. Spilker eds., American Institute of Aeronautics and Astronautics, Inc., 1996).

Figure 1:
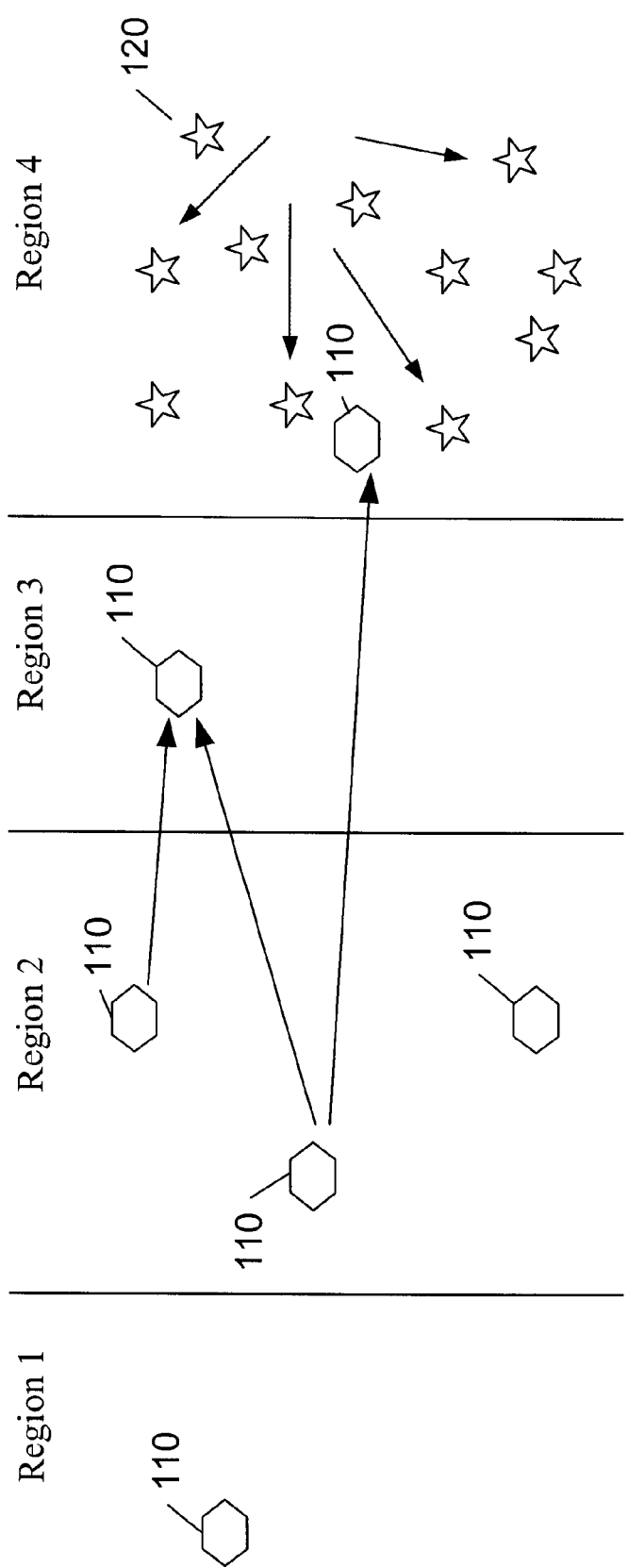
FIG. 1 illustrates an environment 100 comprising satellite based navigation systems 110 and interference signals 120.

FIG. 1 illustrates an environment 100 comprising satellite based navigation systems 110 and one or more interference signal sources 120. For illustrative purposes, satellite-based navigation systems 110 are depicted in four regions of varying distance from interference signal sources 120, with Region 4 being closest to the interference sources 120 and Region 1 being the most distant.

In Region 1, the interference signals from the one or more interference signal sources 120 may have a minimum effect on the navigation system 110. Accordingly, the navigation system 110 in Region I may be capable of processing satellite signals to compute its position, velocity, and time.

The navigation systems 110 in Region 2 are closer to the one or more interference signal sources 120 than the navigation system 110 in Region 1. Accordingly, the interference signals from the one or more interference signal sources 120 may have a greater effect on the navigation systems 110 in Region 2 than on the navigation system 110 in Region 1. However, in Region 2, the navigation systems 110 may still be able to process satellite signals to compute their position, velocity, and time. Furthermore, because the navigation systems 110 are closer to the one or more interference signal sources 120, it may be possible for the navigation systems 110 to locate the one or more interference signal sources 120 according to the techniques disclosed in U.S. Pat. No. 5,936,571, for example.

The navigation system 110 in Region 3 is even closer to the one or more interference signal sources 120. The effect of the interference signals from the one or more interference signal sources 120 on the navigation system 120 in Region 3 may make it impossible to process satellite signals in the same direction as the one or more interference signal sources 120, for example. As a result, it may be impossible for the navigation system 110 in Region 3 to accurately compute its position, velocity, and time based only on satellite signals.

According to an embodiment of the present invention, in addition to using the satellite signals that are capable of being processed, the navigation system 110 in Region 3 may use interference signals from the one or more interference signal sources 120 as navigation signal sources to replace the satellite signals that are incapable of being processed to compute its position, velocity, and time.

As will be discussed in greater detail below, generally, one or more navigation systems 110 in Region 2 may transmit the interference signals they receive from the one or more interference signal sources 120 to the navigation system 110 in Region 3. The interference signals received by the one or more navigation systems 110 in Region 2 may undergo processing, as described in greater detail below, before being transmitted to the navigation system in Region 3. In addition, the one or more navigation systems 110 in Region 2 also transmit their position, velocity, and time to the navigation system 110 in Region 3. The navigation system 110 in Region 3 cross-correlates the interference signals it receives from the one or more interference signal sources 120 with the corresponding interference signals received from the one or more navigation systems 110 in Region 2. The interference signals received by the navigation system 110 in Region 3 may undergo processing, as described in greater detail below, prior to cross-correlation with corresponding interference signals received from the one or more navigation systems 110 in Region 2. The navigation system 110 in Region 3 also receives the corresponding location of the one or more interference signal sources 120. Based on this information, the navigation system may be capable of computing the pseudo-range and pseudo-range rate to the one or more interference sources 120. Using the pseudo-ranges and pseudo-range rates to the interference sources 120 and the pseudo-ranges and pseudo-range rates to the visible satellites, if any, the navigation system 110 in Region 3 may compute its position, velocity, and time.

In Region 4, it may be impossible for the navigation system 110 to process any satellite signals due to the interference signals from the one or more interference sources 120. Therefore, the navigation system 110 in Region 4 may use the pseudo-ranges and pseudo-range rates to a sufficient number of interference sources 120 to compute its position, velocity, and time.

Figure 2:
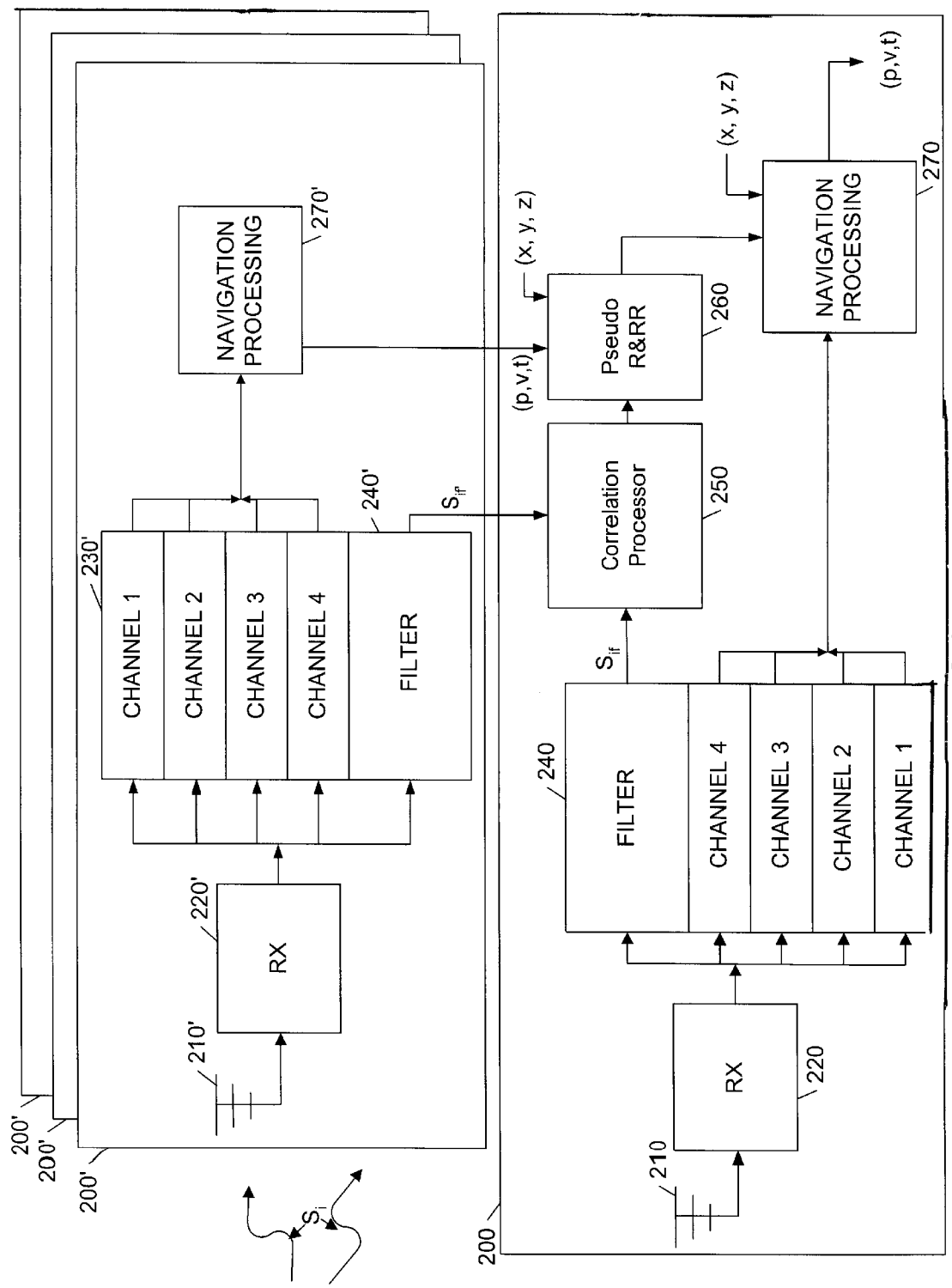
FIG. 2 illustrates a satellite based navigation system according to an exemplary embodiment of the present invention.

FIG. 2 illustrates a satellite based navigation system 200 according to an exemplary embodiment of the present invention.

The system 200 comprises an antenna 210, a receiver 220, a plurality of satellite navigation signal processing channels 230, a filter 240, a cross-correlation processor 250, a pseudo-range and pseudo-range rate (pseudo R&RR) processor 260, and a navigation processor 270.

The antenna 210 may receive signals from one or more satellites in a global navigation satellite system (GNSS) such as the Global Positioning System (GPS) or the Global Satellite Navigation System (GLONASS). However, for the system 200 to unambiguously compute its position in three dimensions, without information from any other sources, tracking of four satellite signals may be needed.

Generally, the receiver 220 converts the satellite signals received by the antenna 210 to a suitable IF frequency. Each processing channel 230 measures the pseudo-range and pseudo-range rate between the system 200 and a corresponding satellite. In the embodiment illustrated in FIG. 2, four processing channels 230 are provided to track four satellites. However, in an alternate embodiment, the system 200 may include additional processing channels 230 to provide additional redundant data to improve performance, for example. Furthermore, the processing channels 230 may be physically different channels or may comprise the same hardware to process signals from different satellites or a combination thereof.

Unfortunately, the antenna 210 may also receive one or more interference signals, $S_{i_n}$, from one or more sources, where $S_{i_n}$ represents the interference signal transmitted by an $n^{th}$ source (n=1, 2, 3, . . . ). Due to the one or more interference signals, $S_{i_n}$, it may be impossible for the processing channels 230 to measure the pseudo-ranges and pseudo-range rates to a sufficient number of satellite to enable the system 200 to unambiguously compute its position and velocity in three dimensions. When this occurs, the system 200 may measure pseudo-ranges and pseudo-range rates to a sufficient number of sources of the interference signals, $S_{i_n}$, which, when combined with the measured pseudo-ranges and pseudo-range rates to the satellite, if any, enables the system 200 to unambiguously compute its position and velocity in three dimensions.

For example, the system 200 may be able to measure the pseudo-ranges and pseudo-range rates to only two satellites due to one or more interference signals, $S_{i_n}$. However, the system 200 may require four pseudo-ranges and pseudo-range rates to unambiguously compute its position and velocity in three dimensions. Therefore, the system 200 may measure the pseudo-ranges and pseudo-range rates to two sources of two interference signals, $S_{i_1}$ and $S_{i_2}$, respectively, to provide the additional pseudo-ranges and pseudo-range rates needed to unambiguously compute its position and velocity in three dimensions. As another example, due to one or more interference signals, $S_{i_n}$, the system 200 may not be able to measure the pseudo-range and pseudo-range rate to any satellite. Accordingly, the system 200 may measure the pseudo-ranges and pseudo-range rates to four sources of four interference signals, $S_{i_1}$, $S_{i_2}$, $S_{i_3}$, and $S_{i_4}$, respectively, to enable the system 200 to unambiguously compute its position and velocity in three dimensions.

The one or more interference signals, $S_{i_n}$, may be converted by receiver 220 and digitally sampled and filtered by the filter 240 to produce filtered interference signals, $S_{if_n}$, which are received by the cross-correlation processor 250.

It is assumed that one or more satellite based navigation systems 200' are available to receive and process the one or more interference signals, $S_{i_n}$, to produce corresponding filtered interference signals, $S'_{if_n}$, in a manner similar to system 200. That is, it is assumed that for each interference signal, $S_{i_n}$, there is a corresponding system 200' available to receive and process the interference signal, $S_{i_n}$, to produce a corresponding filtered interference signal, $S'_{if_n}$. It is further assumed that each system 200' that receives and processes one or more interference signals, $S_{i_n}$, is capable of processing a sufficient number of satellite signals to determine its position, velocity, and time ($p_{200'}$, $v_{200'}$, $t_{200'}$). Each system 200' transmits the corresponding one or more filtered interference signals, $S'_{if_n}$, to the system 200. Each system 200' further transmits its position, velocity, and time to the system 200. The systems 200' may correspond to the navigation systems in Region 2 discussed above. The system 200 may correspond to the navigation system in Region 3 or Region 4 discussed above.

In one embodiment of the present invention, a single system 200' processes the one or more interference signals, $S_{i_n}$, to produce corresponding filtered interference signals, $S'_{if_n}$, in a manner similar to system 200 and transmits the corresponding one or more filtered interference signals, $S'_{if_n}$, to the system 200. In another embodiment of the present invention, more than one system 200' processes the one or more interference signals, $S_{i_n}$. For example, a first system 200' may receive and process one or more interference signals, $S_{i_n}$, while a second system 200' may receive and process the remainder of the interference signals, $S_{i_n}$, to produce corresponding filtered interference signals, $S'_{if_n}$, in a manner similar to system 200. The first and second system 200' transmit the corresponding one or more filtered interference signals, $S'_{if_n}$, to the system 200.

The cross-correlation processor 250 receives the one or more interference signals, $S_{if_n}$, from system 200 and the corresponding one or more interference signals, $S'_{if_n}$, from the corresponding one or more systems 200'. For the one or more interference signals, $S_{if_n}$, received, the cross-correlation processor 250 cross correlates the one or more interference signals, $S_{if_n}$, with the corresponding one or more interference signals, $S'_{if_n}$, to compute the pseudo time difference of arrival (pseudo TDOA) and pseudo frequency difference of arrival (pseudo FDOA) of the one or more interference signals, $S_{i_n}$. The pseudo TDOA equals the TDOA plus the system 200 clock time bias. The pseudo FDOA equals the FDOA plus the system 200 clock frequency bias. The pseudo TDOA and pseudo FDOA for each one or more interference signals, $S_{if_n}$, is received by the pseudo range and pseudo range rate (pseudo R&RR) processor 260.

For each one or more interference signals, $S_{i_n}$, it is assumed that the corresponding source location ($x_n$, $y_n$, $z_n$) of the interference signal, $S_{i_n}$, may be determined according to U.S. Pat. No. 5,936,571. Alternatively, the corresponding source location ($x_n$, $y_n$, $z_n$) of the interference signal, $S_{i_n}$, may be determined through the analysis of electro-optical (EO) or synthetic aperture radar (SAR) images or via any other emitter location technique. For each one or more interference signals, $S_{i_n}$, the corresponding source location ($x_n$, $y_n$, $z_n$) is received by the pseudo R&RR processor 260 in system 200. The pseudo R&RR processor 260 also receives the $p_{200'}$, $v_{200'}$, and $p_{200'}$ values for each system 200' that transmits one or more interference signals, $S_{if_n}$, to the system 200. For each interference signal, $S_{i_n}$, the pseudo R&RR processor 260 computes the pseudo-range and pseudo-range rate between the system 200 and the source of the interference signal, $S_{i_n}$, using the following formulas:

pseudo $R_{200_n} = (c \times \text{pseudo } TDOA_n) + R_{200'_n}$ pseudo $R'_{200_n} = (c/f_n \times \text{pseudo } FDOA_n) + R'_{200'_n}$ where pseudo $R_{200_n}$ and pseudo $R'_{200_n}$ are the pseudo-range and pseudo-range rate, respectively, between the system 200 and the source of the interference signal, $S_{i_n}$; $R_{200'_n}$ and $R'_{200'_n}$ are the range and range rate, respectively, between the source of the interference signal, $S_{i_n}$, and the corresponding system 200'; $f_n$ is the frequency of the interference signal, $S_{i_n}$; and c is the speed of light.

The navigation processor 270 receives the pseudo-ranges and pseudo-range rates from the processing channels 230, if any, and the pseudo-ranges and pseudo-range rates from the pseudo R&RR processor 260 to compute the position (p), velocity (v), and time (t) for the system 200.

In the above description, the system 200 receives and processes both the satellite signals and the interference signals. However, in an alternate embodiment two separate systems may be provided to separately receive and process the satellite signals and the interference signals prior to combining the pseudo-ranges and pseudo-range rates based on the satellite signals, if any, and the pseudo ranges and pseudo range rates based on the interference signals to compute the position (p), velocity (v), and time (t) for the system 200.

The navigation systems may transmit information to another navigation systems using an RF data link or any other suitable device. The navigation systems may receive information via an RF data link or any other suitable device.

Further, the one or more interference signals, $S_{if_n}$ and $S'_{if_n}$, the position, velocity, and time of the one or more navigation system 200', the locations of the sources of the one or more interference signals, and any information processed by the processing channels 230, or a combination of the foregoing, may be transmitted to another system for performing cross correlation, pseudo-range and pseudo-range rate, and navigation calculations, or a combination of the foregoing, to determine the position, velocity, and time of the navigation system 200.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for computing navigation information for a first navigation system, the method comprising:
   receiving N satellite signals capable of being processed;
   receiving at least M interference signals, where M=k−N and K equals the minimum number of satellites required to be tracked for unambiguously determining navigation information for the first navigation system; and
   computing navigation information for the first navigation system based on the at least M interference signals and the N satellite signals capable of being processed.

2. A method according to claim 1, wherein computing navigation information for the first navigation system based on the at least M interference signals and the N satellite signals received and capable of being processed comprises:
   computing, for each of the at least M interference signals, measurements between the first navigation system and a corresponding source of the interference signal;
   computing, for each of the N satellite signals received and capable of being processed, measurements between the first navigation system and a corresponding satellite; and
   computing navigation information for the first navigation system based on the measurements computed for the at least M interference signals and the N satellite signals received and capable of being processed.

3. The method according to claim 2, wherein the measurements comprise pseudo range and pseudo range rate information.

4. The method according to claim 3, wherein the navigation information for the first navigation system comprises a position, a velocity, and a time for the first navigation system.

5. The method according to claim 2, wherein computing, for each of the at least M interference signals, measurements between the first navigation system and a corresponding source of the interference signal comprises:
   receiving from at least one second navigation system information relating to a corresponding interference signal received by the at least one second navigation system;
   computing a pseudo time difference of arrival and pseudo frequency difference of arrival based on the interference signal and the information received from the at least one second navigation system;
   receiving navigation information for the at least one second navigation system; and
   receiving a location of the corresponding source of the interference signal.

6. The method according to claim 5, wherein navigation information on the at least one second navigation system comprises a position, a velocity, and a time for the at least one second navigation system.

7. A first navigation system for computing navigation information comprising:
   means for receiving N satellite signals capable of being processed and at least M interference signals, where M=K−N and K equals the minimum number of satellites required to be tracked for unambiguously determining navigation information for the first navigation system;
   means for computing, for each of the at least M interference signals, measurements between the first navigation system and a corresponding source of the interference signals;
   means for computing, for each of the N satellite signals capable of being processed, measurements between the first navigation system and a corresponding satellite; and
   means for computing navigation information for the first navigation system based on the measurements computed for the at least M interference signals and the N satellite signals capable of being processed.

8. The first navigation system according to claim 7, wherein the measurements comprise pseudo range and pseudo range rate information.

9. The first navigation system according to claim 8, wherein the navigation information for the first navigation system comprises a position, a velocity, and a time for the first navigation system.

10. The first navigation system according to claim 7, wherein means for computing, for each of the at least M interference signals, measurements between the first navigation system and a corresponding source of the interference signal comprises:
    means for receiving from at least one second navigation system information relating to a corresponding interference signal received by the at least one second navigation system;
    means for computing a pseudo time difference of arrival and pseudo frequency difference of arrival based on the interference signal and the information received from the at least one second navigation system;
    means for receiving navigation information for the at least one second navigation system; and
    means for receiving a location of the corresponding source of the interference signal.

11. The first navigation system according to claim 10, wherein navigation information on the at least one second navigation system comprises a position, a velocity, and a time for the at least one second navigation system.

12. A method for computing navigation information for a first navigation system, the method comprising:
    providing a first navigation system a first distance from at least one interference signal source wherein the first navigation system is incapable of receiving and processing satellite signals from a minimum number of satellites required for unambiguously determining navigation information for the first navigation system and wherein the first navigation system receives at least one interference signal from the at least one interference signal source;
    providing at least one second navigation system a second distance from the at least one interference signal source wherein the at least one second navigation system is capable of receiving the at least one interference signal and capable of receiving and processing satellite signals from a minimum number of satellites required for unambiguously determining navigation information for the at least one second navigation system;
    receiving from the at least one second navigation system information relating to the at least one interference signal received by the at least one second navigation system;
    receiving navigation information for the at least one second navigation system;
    receiving a location of the at least one interference signal source; and
    computing navigation information for the first navigation system based on the at least one interference signal received by the first navigation system, the information relating to the at least one interference signal received from the at least one second navigation system, the navigation information for the at least one second navigation system, the location of the at least one interference signal source, and any satellite information based on any satellite signals received by the first navigation system capable of being processed.

13. A system for computing navigation information for a first navigation system, the system comprising:

a first navigation system a first distance from at least one interference signal source wherein the first navigation system is incapable of receiving and processing satellite signals from a minimum number of satellites required for unambiguously determining navigation information for the first navigation system and wherein the first navigation system is capable of receiving at least one interference signal from the at least one interference signal source; and at least one second navigation system a second distance from the at least one interference signal source wherein the at least one second navigation system is capable of receiving the at least one interference signal and capable of receiving and processing satellite signals from a minimum number of satellites required for unambiguously determining navigation information for the at one second navigation system, wherein:

the at least one second navigation system comprises:
  means for transmitting information relating to the at least one interference signal received by the at least one second navigation system; and
  means for transmitting navigation information for the at least one second navigation system; and the first navigation system comprises:
  means for receiving the at least one interference signal from the at least one interference signal source;
  means for receiving navigation information for the at least one second navigation system;
  means for receiving the information relating to the at least one interference signal transmitted by the at least one second navigation system;
  means for receiving a location of the at least one interference signal source; and
  means for computing navigation information for the first navigation system based on the at least one interference signal received by the first navigation system, the information relating to the at least one interference signal transmitted by the at least one second navigation system, the navigation information for the at least one second navigation system, the location of the at least one interference signal source, and any satellite information based on any satellite signals received by the first navigation system capable of being processed.

14. A system for computing navigation information for a first navigation system, the system comprising:

a first navigation system a first distance from at least one interference signal source wherein the first navigation system is incapable of receiving and processing satellite signals from a minimum number of satellites required for unambiguously determining navigation information for the first navigation system and wherein the first navigation system is capable of receiving at least one interference signal from the at least one interference signal source;

at least one second navigation system a second distance from the at least one interference signal source wherein the at least one second navigation system is capable of receiving the at least one interference signal and capable of receiving and processing satellite signals from a minimum number of satellites required for unambiguously determining navigation information for the at least one second navigation system and wherein the at least one second navigation system comprises means for transmitting information relating to the at least one interference signal received by the at least one second navigation system and means for transmitting navigation information for the at least one second navigation system;

means for receiving navigation information for the at least one second navigation system;

means for receiving the information relating to the at least one interference signal transmitted by the at least one second navigation system;

means for receiving a location of the at least one interference signal source; and means for computing navigation information for the first navigation system based on the at least one interference signal received by the first navigation system, the information relating to the at least one interference signal transmitted by the at least one second navigation system, the navigation information for the at least one second navigation system, the location of the at least one interference signal source, and any satellite information based on any satellite signals received by the first navigation system capable of being processed.

\* \* \* \* \*